(12) United States Patent
Yu et al.

(10) Patent No.: US 9,723,476 B2
(45) Date of Patent: Aug. 1, 2017

(54) LOCATION REGISTRATION FOR A DEVICE-TO-DEVICE (D2D) USER EQUIPMENT

(71) Applicant: NOKIA SOLUTIONS AND NETWORKS OY, Espoo (FI)

(72) Inventors: Ling Yu, Espoo (FI); Vinh Van Phan, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/432,116

(22) PCT Filed: Sep. 28, 2012

(86) PCT No.: PCT/EP2012/069218
§ 371 (c)(1),
(2) Date: Mar. 27, 2015

(87) PCT Pub. No.: WO2014/048493
PCT Pub. Date: Apr. 3, 2014

(65) Prior Publication Data
US 2015/0281940 A1     Oct. 1, 2015

(51) Int. Cl.
*H04W 24/00* (2009.01)
*H04W 8/02* (2009.01)
(Continued)

(52) U.S. Cl.
CPC ............. *H04W 8/02* (2013.01); *H04W 4/02* (2013.01); *H04W 60/00* (2013.01); *H04W 76/023* (2013.01)

(58) Field of Classification Search
CPC ..................................................... H04W 8/02
See application file for complete search history.

(56) References Cited

U.S. PATENT DOCUMENTS

2007/0249347 A1   10/2007   Saifullah et al.
2011/0098043 A1   4/2011   Yu et al.
(Continued)

FOREIGN PATENT DOCUMENTS

| EP | 0667725 A2 | 1/1995 |
|---|---|---|
| WO | 2008/004071 A2 | 1/2008 |
| WO | 2012/045369 A1 | 4/2012 |

OTHER PUBLICATIONS

International Search Report and Written Opinion for International Application No. PCT/EP2012/069218, mailed Aug. 23, 2013, 30 pages.

*Primary Examiner* — Idowu O Osifade
(74) *Attorney, Agent, or Firm* — Brake Hughes Bellermann LLP (57) ABSTRACT

The invention relates to device-to-device (D2D) communications an in particular to location registration of a D2D User Equipment (UE) being in idle mode. A D2D capable UE (D2D cluster head) is [1] configured to communicate with a communication network, is [2] able to establish D2D communication with another D2D capable UE, receives [3] from the communication system a configuration so as to send location update related messaging on behalf of UEs with which D2D communications has been established, obtains [4] information of a change of status of a UE regarding a D2D communication or a change of cell of a UE and in response to the information, causes [5] the sending of a message to the communication network, the message comprising a location update request regarding the UE.

19 Claims, 3 Drawing Sheets

(51) Int. Cl.
*H04W 60/00* (2009.01)
*H04W 4/02* (2009.01)
*H04W 76/02* (2009.01)

(56) References Cited

U.S. PATENT DOCUMENTS

| | | | |
|---|---|---|---|
| 2011/0134827 A1 | 6/2011 | Hooli et al. | |
| 2013/0130684 A1* | 5/2013 | Gomes | H04W 8/186 455/435.1 |
| 2013/0183969 A1* | 7/2013 | Kang | H04W 60/00 455/435.1 |
| 2015/0156743 A1* | 6/2015 | Lee | H04W 36/0061 455/426.1 |

\* cited by examiner

FIG. 4B

LOCATION REGISTRATION FOR A DEVICE-TO-DEVICE (D2D) USER EQUIPMENT

This application is a national stage entry of PCT Application No. PCT/EP2012/069218, filed on Sep. 28,2012, entitled "LOCATION REGISTRATION FOR A DEVICE-TO-DEVICE D2D COMMUNICATION USER EQUIPMENT BEING IN IDLE MODE MOBILITY MANAGEMENT", which is hereby incorporated by reference in its entirety.

FIELD

The exemplary and non-limiting embodiments of the invention relate generally to wireless communication systems Embodiments of the invention relate especially to apparatuses, methods, and computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

In radio communication networks, such as the Long Term Evolution (LTE) or the LTE-Advanced (LTE-A) of the 3rd Generation Partnership Project (3GPP), network planning comprises the use of common base stations (Node B, eNodeB). User equipment (UE), or a user terminal (UT), may communicate with another UE or UT via the base station(s), for example. Alternatively, it is proposed that the UEs may communicate directly with each other by applying resources dedicated by the network for a device-to-device (D2D) direct communication. The D2D communication has proven to be network efficient by offloading the traffic processed in the base station(s), for example.

Examples of D2D communications include direct communications in a cluster of proximity devices; autonomous D2D communications in cellular network; grid or group of local machines communicating with each other while performing certain tasks in co-operative way; and advanced cellular device acting as a gateway for a number of low-capability devices or machines to access cellular network.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus comprising: at least one processor and at least one memory including a computer program code, the at least one memory and the computer program code configured to, with the at least one processor, cause the apparatus at least to: maintain for user equipment a two-level location registration comprising multi-cell location registration and device-to-device based location registration.

According to an aspect of the present invention, there is provided an apparatus comprising: at least one processor and at least one memory including a computer program code, the at least one memory and the computer program code configured to, with the at least one processor, cause the apparatus at least to: communicate with a communication network; be configured to establish direct device-to-device communication with user equipment; control the reception from the communication system of a configuration so as to send location update related messaging on behalf of user equipment with which direct device-to-device communication has been established; obtain information of a change of status of user equipment regarding a direct device-to-device communication or a change of cell of user equipment; in response to the information, cause the sending of a message to the communication network, the message comprising a location update request regarding the user equipment.

According to an aspect of the present invention, there is provided an apparatus comprising: at least one processor and at least one memory including a computer program code, the at least one memory and the computer program code configured to, with the at least one processor, cause the apparatus at least to: obtain information on a device-to-device based location registration; establish direct device-to-device communication as a response to the obtained information.

According to yet another aspect of the present invention, there is provided a method comprising: communicate with a communication network; be configured to establish direct device-to-device communication with user equipment; control the reception from the communication system of a configuration so as to send location update related messaging on behalf of user equipment with which direct device-to-device communication has been established; obtain information of a change of status of user equipment regarding a direct device-to-device communication or a change of cell of user equipment; in response to the information, cause the sending of a message to the communication network, the message comprising a location update request regarding the user equipment.

According to yet another aspect of the present invention, there is provided a method comprising: maintain for user equipment a two-level location registration comprising multi-cell location registration and device-to-device based location registration.

According to yet another aspect of the present invention, there is provided a method comprising: obtain information on a device-to-device based location registration; establish direct device-to-device communication as a response to the obtained information.

According to yet another aspect of the present invention, there is provided a computer program embodied on a computer-readable storage medium, the computer program comprising program code for controlling a process to execute a process, the process comprising: communicate with a communication network; be configured to establish direct device-to-device communication with user equipment; control the reception from the communication system of a configuration so as to send location update related messaging on behalf of user equipment with which direct device-to-device communication has been established; obtain information of a change of status of user equipment regarding a direct device-to-device communication or a change of cell of user equipment; in response to the information, cause the sending of a message to the communication network, the message comprising a location update request regarding the user equipment.

LIST OF DRAWINGS

Some embodiments of the present invention are described below, by way of example only, with reference to the accompanying drawings, in which.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Some embodiments of the present invention are applicable to user equipment (UE), transceiver, modem, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN), HSPA (High Speed Packet Access), long term evolution (LTE®, known also as evolved UMTS Terrestrial Radio Access Network E-UTRAN), long term evolution advanced (LTE-A), Wireless Local Area Network (WLAN) based on IEEE 802.11 standard, worldwide interoperability for microwave access (WiMAX®), Bluetooth®, personal communications services (PCS) and systems using ultra-wideband (UWB) technology. IEEE refers to the Institute of Electrical and Electronics Engineers. For example, LTE® and LTE-A are developed by the Third Generation Partnership Project 3GPP. In addition, the development of a Beyond 4G (B4G) radio system has begun.

In the following, different exemplifying embodiments will be described using, as an example of an access architecture to which the embodiments may be applied, a radio access architecture based on long term evolution advanced (LTE Advanced, LTE-A), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately.

Figure 1:
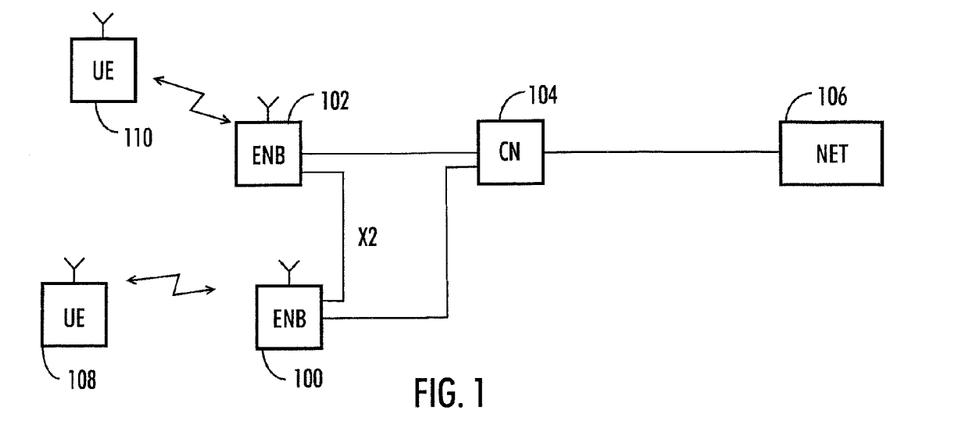
FIGS. 1 and 2 illustrate examples of communication environments.

FIG. 1 illustrates a simplified view of a general communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

FIG. 1 shows eNodeBs 100 and 102 connected to core network CN 104 of a communication system. The eNodeBs are connected to each other over an X2 interface.

The eNodeBs 100, 102 that may also be called base stations of the radio system may host the functions for Radio Resource Management: Radio Bearer Control, Radio Admission Control, Connection Mobility Control, Dynamic Resource Allocation (scheduling). Depending on the system, the counterpart on the CN side can be a serving gateway (S-GW, routing and forwarding user data packets), packet data network gateway (P-GW, for providing connectivity of user devices (UEs) to external packet data networks), and/or mobile management entity (MME), etc. The MME (not shown) is responsible for the overall user terminal control in mobility, session/call and state management with assistance of the eNodeBs through which the user terminals connect to the network. The core network may also comprise a device-to-device registration server which may be configured to maintain and process device-to-device communication related information.

The communication system is also able to communicate with other networks, such as a public switched telephone network, other wireless communication networks or the Internet 106. The communication network may also be able to support the usage of cloud services. It should be appreciated that eNodeBs or their functionalities may be implemented by using any node, host, server or access point etc. entity suitable for such a usage.

User equipment UE refers to a portable communication device. Such communication devices may include wireless mobile communication devices operating with or without a subscriber identification module (SIM), including, but not limited to, the following types of devices: mobile phone, smartphone, Universal Serial Bus (USB) modem, personal digital assistant (PDA), tablet computer, laptop computer. The following embodiments are only examples.

Further, although the apparatuses have been depicted as single entities, different units, processors and/or memory units (not all shown in FIG. 1) may be implemented.

In the example of FIG. 1, UE 108 is connected to the eNodeB 100 and UE 110 is connected to eNodeB 102.

It is obvious for a person skilled in the art that the depicted system is only an example of a part of a radio access system and in practise, the system may comprise a plurality of eNodeBs, the user equipment may have an access to a plurality of radio cells and the system may comprise also other apparatuses, such as physical layer relay nodes or other network elements, etc. At least one of the NodeBs or eNodeBs may be a Home eNodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The eNodeBs of FIG. 1 may provide any kind of these cells. A cellular radio system may be implemented as a multilayer network including several kinds of cells. Typically, in multilayer networks, one node provides one kind of a cell or cells, and thus a plurality of eNodeBs are required to provide such a network structure.

Recently for fulfilling the need for improving the deployment and performance of communication systems, the concept of "plug-and-play" eNodeBs has been introduced. Typically, a network which is able to use "plug-and-play" eNode Bs, includes, in addition to Home eNodeBs (HeNBs), or Home NodeBs (HNBs), a HeNB gateway (HeNB GW), or HNB-Gateway (HNB GW) (not shown in FIG. 1). A HeNB GW or HNB-GW, which is typically installed within an operator's network may aggregate traffic from a large number of HNBs back to a core network.

Figure 2:
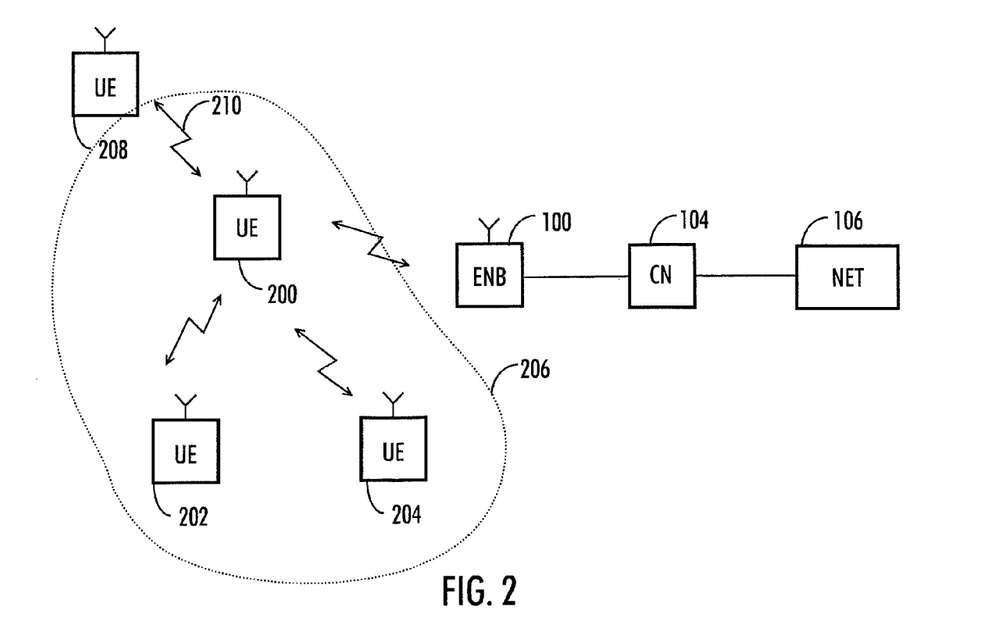

In FIG. 2 which is based on the exemplary system shown in FIG. 1, UEs 200, 202 and 204 are located in the same area and are configured to communicate directly with each other with device-to-device communication. The devices may also communicate with the eNodeB 100. The devices 200, 202 and 204 may form a device cluster 206. A device cluster may be formed with or without network involvement. In an embodiment, the network may advertise the device cluster to other nearby UEs. FIG. 2 is presented herein for clarification purposes only and it should not be used to limit the implementation of embodiments. As an example of one possible variation it is put forward that not all the user devices in the area have to be in a device cluster or a plurality of clusters may be provided. In FIG. 2, user equipment 200 is a master device or cluster head of the device cluster. In this example, other user devices 202 and 204 may communicate with the master. They may also communicate directly with each other and/or communicate with the eNodeB. It is also an option that the master device may be changed or it may authorize one or more devices to communicate with the eNodeB 100 on the behalf of the cluster. It is obvious that the composition of the cluster may change in the course of time, for example.

D2D communication may be controlled by a network. Examples of D2D communications include direct communications in a cluster of proximity devices; autonomous D2D communications in cellular network; a grid or group of local machines communicating with each other while performing certain tasks in cooperative way; and advanced cellular device acting as a gateway for a number of low-capability devices or machines to access cellular network.

In the following, the term D2D/D2D cluster used below denotes device-to-device communication/device-to-device cluster.

D2D communication or D2D cluster may be operated in autonomous mode or in a network controlled fashion. For autonomous D2D/D2D cluster, the UE acting as a cluster head plays the key role for managing the cluster and may be able to detect the UE joining/leaving the cluster based on the request from UE (e.g. for joining/leaving the cluster) or probing the UE (e.g. for detecting the UE leaving the cluster). In this case, the UE may use the contention based access to send the request.

For network controlled D2D/D2D cluster, the network may play the key role for managing the cluster (at least from resource management/allocation point of view). E.g. UE may report to the network for the discovered D2D cluster and request to join the cluster from the network. The network may then indicate to the UE the radio resource used for joining the D2D cluster and also indicate to cluster header for the joining request. Of course, even in this case, the final joining confirmation may be from UE itself and report to the network by the cluster header (in the same report message, the D2D based location update regarding the idle mode UE can be transmitted to the network).

Embodiments of the invention are not related to any specific D2D or D2D cluster configuration and the above description is provided as an illustrative example of some possible configurations.

Some of the tasks of idle mode mobility management in cellular communication systems are location/tracking area update and paging. In location/tracking area update UE reports or registers its current location/tracking area periodically and when it moves from one location area to the next. In paging the network searches for an UE by broadcasting the paging message in all the cells of the location/tracking area in which the UE is currently registered. The signalling cost of location/tracking area update and paging is mutually conflicting as a smaller location/tracking area reduces the paging cost while it introduces a higher signalling cost for more frequent location/tracking area update when UE moves and vice versa. Though the "proper" planning of location/tracking area may provide a trade-off solution, the total cost of location/tracking area update and paging may not be improved much due to the conflicting nature of the two fundamental operations of idle mode mobility management.

In an embodiment, UEs which are in Radio Resource Control (RRC) connected state in D2D communication or device cluster may be utilised to offer location tracking service for idle mode UEs joining the cluster. This may provide more precise location registration and tracking without extra location update signalling overhead, hence reduce the paging costs and the total idle mode mobility management costs.

In an embodiment, a hierarchical location registration mechanism is proposed. A multi-cell involved location/tracking area adopted by current cellular communication systems is one level of location tracking granularity and on top of that the D2D or device cluster based location registration may provide finer location tracking granularity (on cell/sector level) for idle mode UEs.

Assume that UE 208 is in idle mode and nearing the device cluster 206 which offers device cluster based location registration service. The UE 208, as it becomes aware of the device cluster 206 and a location registration service, may setup a D2D link 210 or join the device cluster 206 for more precise location registration. In an embodiment, when the cluster head 200 in RRC Connected state detects the new cluster member, it may be configured to send a Non-Access Stratum (NAS) message of Location/Tracking Area Update Request on behalf of the idle mode UE 208. Thus, the UE 208 itself does not send the message but the cluster head (or another predetermined member of the cluster).

In an embodiment, UE may establish a D2D connection with another UE, and the D2D peer which is in RRC Connected state may be configured to send a Non-Access Stratum (NAS) message of Location/Tracking Area Update Request on behalf of an idle mode UE with which it has established D2D communication.

In the following, some embodiments are disclosed in further details in relation to the flowcharts of FIGS. 3A, 3B, 3C and 3D.

Figure 3A:
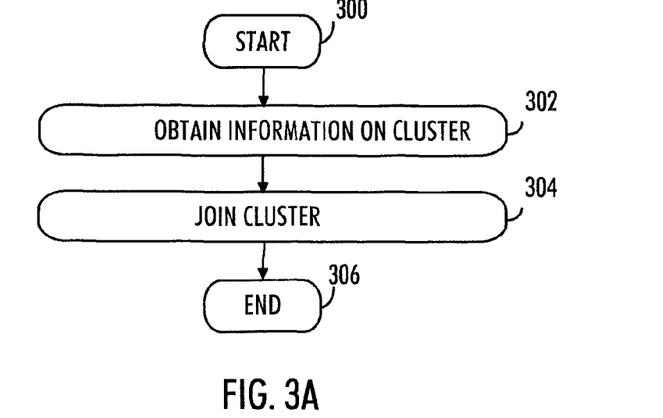
FIGS. 3A, 3B, 3C and 3D are flow charts illustrating some embodiments of the invention.

FIG. 3A illustrates an example of the operation of UE 208. The process starts in step 300.

In step 302, the UE obtains information on a device cluster and its services. The UE may be in idle mode.

In step 304, the idle mode UE, upon finding the location registering service and discovering the device cluster offering the service, may setup a device-to-device link 210 or join the device cluster for more precise location registration and tracking.

In an embodiment, the UE may send information about itself to the cluster head. The information may be idle-mode UE identity (paging token), the cell the idle UE is currently camping on (Public Land Mobile Network identification PLMN ID and Global Cell ID), for example. The cluster head may use the information when sending location related messages on behalf of the idle UE.

In an embodiment, after joining the cluster, the idle UE forms a location update message and sends it to the cluster head. The cluster head then forwards that message to the network.

The process ends in step 306.

There are various ways how the idle mode UE may obtain information on the location registration service provided by a device cluster.

In an embodiment, the service may be indicated on cell level by broadcasted system information of communication network. For example, there may be a 1 bit field to indicate support of the service or not in the cell. In addition, more information may be broadcasted to further indicate e.g. the searching carriers and beacon information to assist idle mode UEs for D2D and device cluster discovery.

In an embodiment, the service may be indicated by a multicast service of the communication network to a certain group of UEs, for example in a certain area.

In an embodiment, the D2D devices or cluster heads, under the control or supervision of the communication network, may indicate the support of the service in their beacon messages.

In an embodiment, the service may be negotiated between a D2D cluster and a communication network and provided to the D2D cluster members which are in idle mode.

In case of multi-operators involved a D2D/D2D cluster, the location/tracking area update service may be offered to the idle mode UEs of different operator networks. The service indication for multi-operators support may be included in the D2D/D2D cluster beacon messages.

The same kind of procedure as in FIG. 3A may be applied when two UEs have a D2D communication and one device is in idle mode and the other is in RRC Connected state.

Figure 3B:
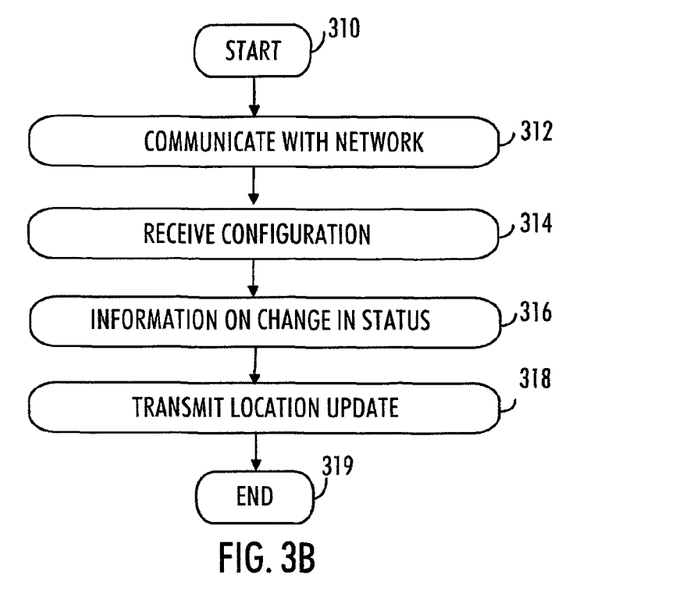

FIG. 3B illustrates an example of the operation of an apparatus. The apparatus may be a cluster head or a D2D peer 200. The process starts in step 310.

In step 312, the apparatus is configured to be in communication with a communication network and is capable of establishing direct D2D communication with user equipment.

In step 314, the apparatus is configured to control the reception from the communication system of a configuration or instructions so as to send location update related messaging on behalf of user equipment with which direct communication has been established.

In step 316, the apparatus is configured to obtain information on a change of status of user equipment regarding direct communication For example, the cluster head may detect or be informed that UE is joining the cluster or is leaving the cluster.

In an embodiment, the apparatus may receive from the UE information about the UE. The information may be the idle-mode UE identity (paging token), the cell the idle UE is currently camping on (PLMN ID and Global Cell ID), for example. The apparatus may use the information when sending location related messages on behalf of the idle UE.

In an embodiment, after joining the cluster, the apparatus receives a location update message from the idle mode UE that joined the cluster. The apparatus may be configured to forward the message to the network.

In step 318, the apparatus is configured to send the network a message comprising a location update request regarding the user equipment on the basis of the information, detection or message.

In an embodiment, the network may learn about relevant authenticated and authorized contexts of the idle UE from a D2D registration server, triggered by an indication from the cluster head or serving eNodeB when the idle UE joins or leaves the cluster. In this case, to enhance security for idle UE, some D2D ID (D2D connection/link ID) may be used by the cluster head (or D2D peer in RRC connected state) for location update of the idle mode UE. The network may maintain a UE ID mapping table between D2D ID and the network assigned ID used for idle mode management.

The process ends in step 319.

In an embodiment, the D2D peer or cluster head or cluster member is authenticated and trusted counterpart, and the transmission over D2D connection is secure and ciphered. Therefore the UE ID and security parameters of the idle UE may be conveyed by the connected UEs which have a D2D connection with the idle UE. Alternatively the network may maintain the IDs and security parameters for the idle mode UE and also the mapping with the D2D identifier. As the D2D operation is also under the control of the network, it may be secure enough to maintain the security for the idle mode UE based on the relationship of D2D link.

Thus in an embodiment, the D2D peer or cluster head/member in RRC Connected state sends the NAS message of Location/Tracking Area Update Request on behalf of the idle mode UEs in the cluster. In addition to the UE identifier and security key related parameters, the update type field may be extended to include two additional types: a D2D-based-Update-Start and a D2D-based-Update-End. The D2D-based-Update-Start type is used when location/tracking area update request is initiated due to idle mode UE setting-up or joining the D2D/D2D cluster. The D2D-based-Update-End type is used when the request is initiated due to idle mode UE releasing or leaving the D2D/D2D cluster.

If multiple cells (either in one operator network or multiple operator networks) are involved in the D2D/D2D cluster, the D2D/D2D cluster based Location/Tracking Area Update Request message may include the operator and cell identifier (such as E-UTRAN Cell Global Identifier EGCI) of the cell the idle mode UE is camping on. During the period that an idle mode UE is in the D2D/D2D cluster, periodic location/tracking area update which is used to allow the network to know the availability of the idle mode UE need not to be initiated. The D2D/D2D cluster head is responsible for monitoring availability of the idle mode UE and reporting to network by Location/Tracking Area Update Request with D2D-based-Update-End type when idle mode UE is leaves the D2D/D2D cluster.

In an embodiment, if multiple cells are involved in the D2D/D2D cluster, the D2D/D2D cluster based location/tracking area update procedure may be triggered when idle mode UE reselects a new cell. The cluster head or D2D peer may detect the change of cell or cell reselection of user equipment with which direct device-to-device communication has been established and send communication network a message comprising location update request.

Figure 3C:
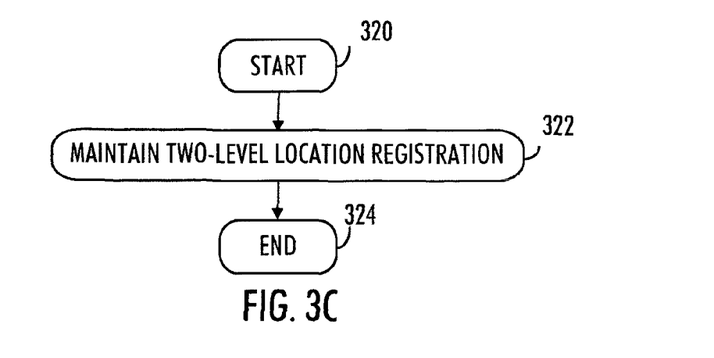

FIG. 3C illustrates an example of the operation of a network element of a communication system. In an embodiment, the network element is mobile management entity (MME) (and some D2D registration server functionality). The process starts in step 320.

In step 322, the network element is configured to maintain for user equipment a two-level location registration comprising multi-cell location registration and device-to-device or device-to-device cluster based location registration. The multi-cell location registration may also be denoted as conventional tracking/location area registration The process ends in step 324.

The D2D/D2D cluster based location registration of two-level location registration is utilized when an idle mode UE has a D2D peer or has joined a device cluster which provides the idle mode mobility service. Otherwise, the conventional tracking/location area registration is applied. The communication system is configured to keep a two level location registration information for an idle mode UE after Location/Tracking Area Update Request with D2D-based-Update-Start type is received. At this phase, the D2D/D2D cluster based location registration on cell or sector level and based on D2D serving cell is the active location information for the involved idle mode UEs. This means that the idle mode UE will be paged on the registered cell or sector level. The multi-cell involved location registration based on ordinary Location Area Identifier/Tracking Area Identifier LAI/TAI is suspended at this phase and will be resumed when network gets the Location/Tracking Area Update Request with D2D-based-Update-End type for the involved idle mode UE.

Figure 3D:
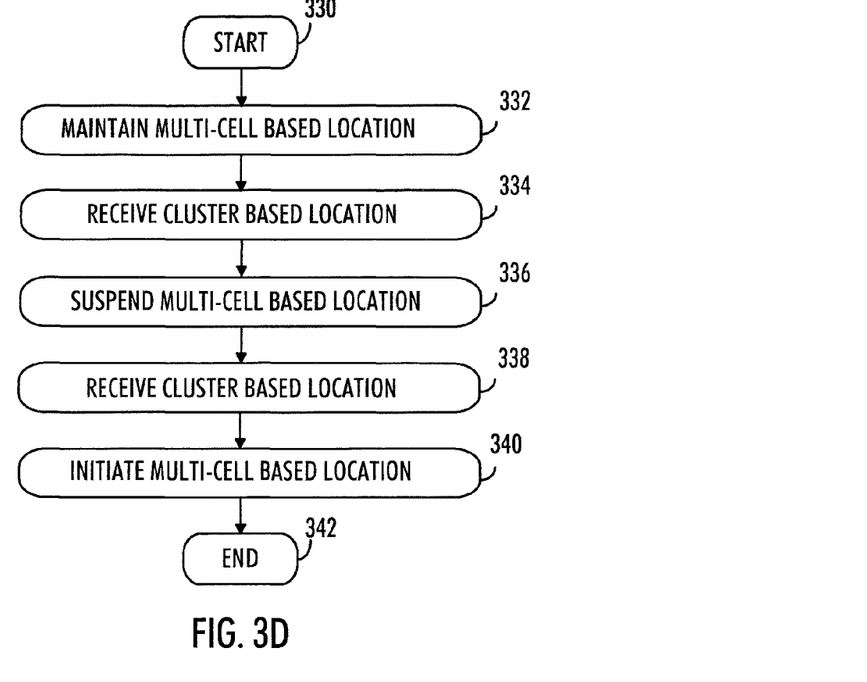

FIG. 3D illustrates in more detail an example of the operation of a network element of a communication system. In an embodiment, the network element is mobile management entity (MME), together with some D2D registration server functionality coupled with multi-operator coordination and support. The process starts in step 330.

In step 332, the network element maintains multi-cell location registration of an idle mode UE.

In step 334, the network element receives from an Radio Resource Control (RRC) connected state user equipment or a device cluster a message comprising location update request regarding the idle mode user equipment which establishes D2D connection with RRC connected state UE or joins the cluster.

In step 336, the network element is configured to suspend the multi-cell location registration of the user equipment on the basis of the message and initiate the device cluster based location registration.

In step 338, the network element receives from the connected state UE or the device cluster a message comprising location update request regarding user equipment releasing the D2D connection or leaving the cluster.

In step 340, the network element is configured to suspend the device cluster based location registration on the basis of the message and initiate the multi-cell location registration of the user equipment.

The process ends in step 342.

The proposed D2D/D2D cluster based location tracking method may provide more precise location tracking granularity for the idle mode UE without or with minimal extra signalling overhead. Though separate Location/Tracking Area Update procedure messages are described above the messages can be embedded into the D2D related control messages as well. For instance, for network controlled D2D/D2D cluster, the D2D/D2D cluster may need to have signalling exchange towards network when the status of D2D/D2D cluster has changed (for example when a new D2D link is setup or released or new members join or leave D2D cluster). The proposed D2D/D2D cluster based location tracking information can be imbedded into such control signalling. Furthermore, the location tracking information of the idle mode UEs can also be deduced from the D2D/D2D cluster related mobility management messages. In addition, the D2D/D2D cluster based location tracking method does not require the idle mode UEs to establish RRC connection and go into RRC connected state to report its location update, which saves the network signalling load, especially in the case of mass movement.

Furthermore, the D2D/D2D cluster based location tracking method saves the paging costs as the paging can be done on cell/sector level with the normal paging procedure of current cellular systems.

In an embodiment, a single-cell paging may be utilised in connection with the proposed two-level location registration, as the network will be aware of the cell the UE is camping on.

In an embodiment, the network may be configured to send a paging message to user equipment by just the one cell the user equipment is camping on. Alternatively the network may be configured to send the paging message via the cluster head by the serving cell of D2D cluster the user equipment belongs to.

The paging message may contain some initial resource allocation in advance, such as dedicated RACH preamble, Cell Radio Network Temporary Identifier C-RNTI, control channel resource info (enhanced Physical Downlink Control Channel ePDCCH/enhanced Physical uplink shared channel ePUCCH) or even semi-persistent allocation information for the idle UE to get quick access to the network.

In an embodiment, in case the cell the idle UE is camping on is the same as the serving cell of the D2D cluster the idle UE may use the timing advance information of the D2D cluster to access the cell right away, bypassing initial access RACH procedure. Thus, the cluster head may provide the timing advance for the idle UE via D2D connection.

Figure 4A:
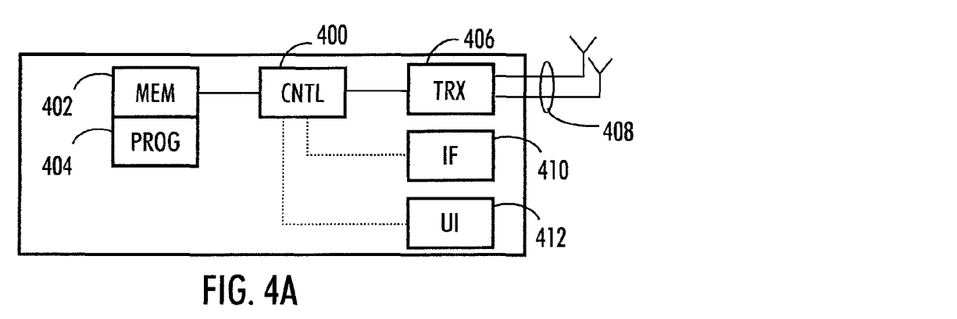
FIGS. 4A and 4B illustrate examples of apparatuses.

FIG. 4A illustrates an embodiment. The figure illustrates a simplified example of a device in which embodiments of the invention may be applied. In some embodiments, the device may user equipment or a part of user equipment configured to communicate with network elements of a communication network. Examples of network elements are a base station or eNodeB and a mobile management entity (MME).

It should be understood that the apparatus is depicted herein as an example illustrating some embodiments. It is apparent to a person skilled in the art that the device may also comprise other functions and/or structures and not all described functions and structures are required. Although the device has been depicted as one entity, different modules and memory may be implemented in one or more physical or logical entities.

The device of the example includes a control circuitry 400 configured to control at least part of the operation of the device.

The device may comprise a memory 402 for storing data. Furthermore the memory may store software 404 executable by the control circuitry 400. The memory may be integrated in the control circuitry.

The device comprises one or more transceivers 406. The transceiver is operationally connected to the control circuitry 400. It may be connected to an antenna arrangement 408 comprising one more antenna elements or antennas. The transceiver may be configured to communicate with a communication system using appropriate protocols. The device may comprise a Bluetooth® transceiver, a Near Field Communication (NFC) transceiver and a Wireless Local Area Network (WLAN) transceiver based on IEEE 802.11 standard.

The software 404 may comprise a computer program comprising program code means adapted to cause the control circuitry 400 of the device to control a transceiver 406. The control circuitry 400 is configured to execute one or more applications. The applications may be stored in the memory 402.

In some embodiments the device may further comprise an interface 410 operationally connected to the control circuitry 400. The interface may be used to connect accessories to the device. The interface may be Universal Serial Bus USB or High-Definition Multimedia Interface HDMI, for example.

The device may further comprise a user interface 412 operationally connected to the control circuitry 400. The user interface may comprise one or more of following: a (touch sensitive) display, a keyboard, a microphone and a speaker.

In an embodiment, the device is the idle mode UE 208. The device may comprise software 404 configured to cause the control circuitry 400 of the device to obtain information on a device cluster and its services or a D2D peer and, upon finding a location registering service and discovering the device cluster or D2D peer offering the service, setup a device-to-device link or join the device cluster for more precise location registration.

In an embodiment, the device is a cluster head 200. The device may comprise software 404 configured to cause the control circuitry 400 of the device to detect a change of status of user equipment regarding a device cluster and to send the network the cluster is connected to a message comprising location update request regarding the user equipment on the basis of the detection.

Figure 4B:
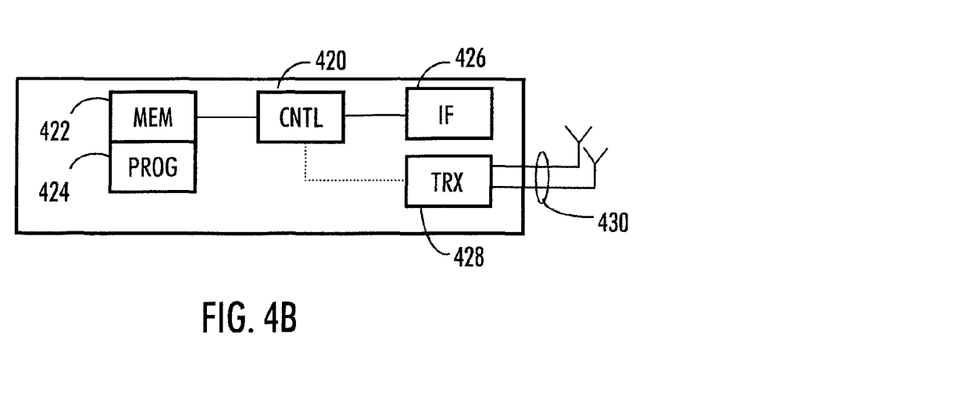

FIG. 4B illustrates an embodiment. The figure illustrates a simplified example of an apparatus in which embodiments of the invention may be applied. In some embodiments, the apparatus may a network element configured to manage location registration of at least some UEs of a communication system. In some embodiments, the apparatus may be a mobile management entity (MME) or D2D registration server functionality coupled with multi-operator coordination and support.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 420 configured to control at least part of the operation of the apparatus.

The apparatus may comprise a memory 422 for storing data. Furthermore the memory may store software 424 executable by the control circuitry 400. The memory may be integrated in the control circuitry. The memory may be operationally connected to the control circuitry 420. In some embodiments, the memory may be at least in part external to the apparatus and connected to the apparatus via a suitable interface.

The apparatus may further comprise an interface 426 operationally connected to the control circuitry 420. The interface may connect the apparatus to other respective apparatuses and to other network elements such as such base stations or eNodeBs or to network elements of a Core Network.

In some embodiments the apparatus may further comprise one or more transceivers 428. The transceiver is operationally connected to the control circuitry 420. It may be connected to an antenna arrangement 430 comprising one more antenna elements or antennas.

The device may comprise software 404 configured to cause the control circuitry 400 of the device to maintain for user equipment a two-level location registration comprising multi-cell location registration and device cluster based location registration. The apparatus may be configured to store information on location registration in memory 422.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be at least one software application, module, or unit configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. Computer programs may be coded by a programming language, which may be a high-level programming language, such as objective-C, C, C++, C#, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

In an embodiment, the apparatus comprises means for detecting a change of status of user equipment regarding a device cluster; and means for sending the network the apparatus is connected to a message comprising location update request regarding the user equipment on the basis of the detection.

In an embodiment, the apparatus comprises means for maintaining for user equipment a two-level location registration comprising multi-cell location registration and device cluster based location registration.

In an embodiment, the apparatus comprises means for obtaining information on a device cluster and device cluster based location registration; and means for joining a device cluster on the basis of obtained information.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
   at least one processor and at least one memory including a computer program code, the at least one memory and the computer program code configured to, with the at least one processor, cause the apparatus at least to:
   communicate, by a first user equipment, with a communication network;
   establish, by the first user equipment, a direct device-to-device communication with a second user equipment;
   control, by the first user equipment, a reception from the communication network, of a configuration so as to send location update related messaging on behalf of the second user equipment with which the direct device-to-device communication has been established;
   receive, by the first user equipment from the second user equipment, information of a change of status of the second user equipment regarding the direct device-to-device communication or a change of a cell of the second user equipment; and
   in response to receiving the information from the second user equipment, cause a sending, by the first user equipment on behalf of the second user equipment, of a message to the communication network by using the configuration, the message comprising a location update request for the second user equipment.

2. The apparatus of claim 1, wherein the message comprises information on the change of the status including whether the second user equipment is joining or leaving the direct device-to-device communication or whether the second user equipment reselects a new cell to camp on.

3. The apparatus of claim 1, further configured to:
   receive, by the first user equipment, a request from the second user equipment to send the message comprising location update request regarding the second user equipment; and
   send, by the first user equipment, the message on the basis of the request.

4. The apparatus of claim 1, wherein the message is sent by the first user equipment on behalf of the second user equipment which is in idle mode.

5. The apparatus of claim 1, wherein the message comprises the identity of the second user equipment and security key related parameters.

6. The apparatus of claim 1, wherein the message comprises information on the identifier of the cell the second user equipment is camping on.

7. The apparatus of claim 1, wherein the apparatus is a cluster head of a device cluster.

8. The apparatus of claim 1, further configured to transmit information to user equipment about the ability to send messages comprising location update requests on behalf of the user equipment.

9. The apparatus of claim 1, further configured to:
   receive by the first user equipment from the second user equipment a location update message; and
   forward, by the first user equipment, the location update message to the communication network.

10. The apparatus of claim 1, further configured to utilize a device-to-device identification of the second user equipment when sending the message that includes the location update request for the second user equipment.

11. A method comprising:
    communicating, by a first user equipment, with a communication network;
    establishing, by the first user equipment, a direct device-to-device communication with a second user equipment;
    controlling, by the first user equipment, a reception from the communication network of a configuration so as to send location update related messaging on behalf of the second user equipment with which the direct device-to-device communication has been established;
    receiving, by the first user equipment from the second user equipment, information of a change of status of the second user equipment regarding the direct device-to-device communication or a change of a cell of the second user equipment; and
    in response to receiving the information from the second user equipment, causing the sending, by the first user equipment on behalf of the second user equipment, of a message to the communication network by using the configuration, the message comprising a location update request for the second user equipment.

12. The method of claim 11, wherein the message comprises information on the change of the status including whether the second user equipment is joining or leaving the direct device-to-device communication or whether the second user equipment reselects a new cell to camp on.

13. The method of claim 11, further comprising:
receiving, by the first user equipment, a request from the second user equipment to send the message comprising location update request regarding the second user equipment; and
sending, by the first user equipment, the message on the basis of the request.

14. The method of claim 11, wherein the message is sent by the first user equipment on behalf of the second user equipment which is in idle mode.

15. The method of claim 11, wherein the message comprises the identity of the second user equipment and security key related parameters.

16. The method of claim 11, wherein the message comprises information on the identifier of the cell the second user equipment is camping on.

17. The method of claim 11, further comprising:
transmitting information to user equipment about the ability to send messages comprising location update requests on behalf of the user equipment.

18. The method of claim 11, further comprising:
receiving by the first user equipment from the second user equipment a location update message; and
forwarding, by the first user equipment, the location update message to the communication network.

19. The method of claim 11, further comprising:
utilizing a device-to-device identification of the second user equipment when sending the message that includes the location update request for the second user equipment.

* * * * *

UNITED STATES PATENT AND TRADEMARK OFFICE
CERTIFICATE OF CORRECTION

PATENT NO.       : 9,723,476 B2                                             Page 1 of 1
APPLICATION NO.  : 14/432116
DATED            : August 1, 2017
INVENTOR(S)      : Yu et al.

It is certified that error appears in the above-identified patent and that said Letters Patent is hereby corrected as shown below:

On the Title Page

Column 2, Item (57), under "ABSTRACT", Line 2, delete "an" and insert -- and --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*